UNITED STATES PATENT OFFICE.

THOMAS WELLS, OF NEAR DECATUR, MISSISSIPPI.

FERTILIZER.

SPECIFICATION forming part of Letters Patent No. 283,308, dated August 14, 1883.

Application filed December 5, 1882. (No specimens.)

*To all whom it may concern:*

Be it known that I, THOMAS WELLS, a citizen of the United States, residing near Decatur, in the county of Newton and State of Mississippi, have invented certain new and useful Improvements in Fertilizers; and I do hereby declare the following to be a full, clear, and exact description of the invention, such as will enable others skilled in the art to which it appertains to make and use the same.

This invention relates to improvements in fertilizers, and is intended particularly to be used in the cotton-growing regions, or wherever the nature of the land requires the use of a fertilizer.

I have found this compound to be equal to the best fertilizers made in New York or Boston at a cost of fifty dollars per ton, after testing it side by side with the different brands of commercial fertilizers for the past four years.

In making this fertilizer, I use the following ingredients: carbonate of ammonia, eight pounds; carbonate of soda, twelve pounds; salt, fifty pounds; wood-ashes, three bushels, or one and a half bushel of lime. The above to be mixed with twenty bushels of stable-manure. If other manure—such as yard or lot scrapings—is used, add one-third (⅓) more chemicals, except salt, as above.

How to make: First pile the manure, then pull down, mixing in the ashes thoroughly. Heap it up, let it stand twenty-four hours, then pull it down, and add the chemicals; dissolve the ammonia and soda in water, then heap it up, and in a few days it will be ready for use.

I estimate a bushel of stable-manure at eighty-five pounds. It will therefore require to make a ton of fertilizer about twenty bushels stable-manure, or one thousand seven hundred pounds; carbonate of ammonia, eight pounds; carbonate of soda, twelve pounds; ashes, (three bushels, say about,) one hundred and thirty pounds; salt, (in a dry state,) one hundred and fifty pounds; total, two thousand pounds. Add the ashes to the stable-manure in piling, then let the composition stand twenty-four hours; then pull it down, and add the ammonia and soda dissolved, also the salt, in a dry state, at the same time. The only water used is that employed to dissolve the ammonia and soda, which will be found sufficient, except when the composition is unusually dry.

Put two hundred and fifty to three hundred pounds to the acre.

Having described my invention, what I desire to secure by Letters Patent, and claim, is—

A fertilizer composed of carbonate of ammonia, eight pounds; carbonate of soda, twelve pounds; salt, fifty pounds; wood-ashes, three bushels, mixed with twenty bushels of stable-manure, in the manner substantially as described.

In testimony whereof I affix my signature in presence of two witnesses.

THOMAS WELLS.

Witnesses:
R. R. WANSLEY,
J. C. MEHL.